June 11, 1946.        R. D. SMITH        2,401,980
MEANS FOR GAUGING VEHICLE FRAMES
Filed Oct. 11, 1943
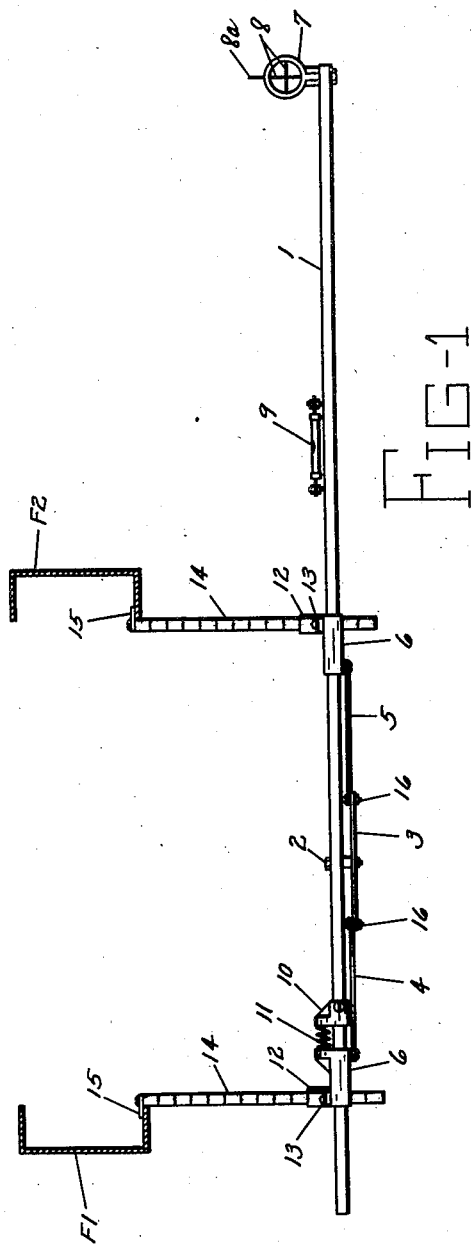
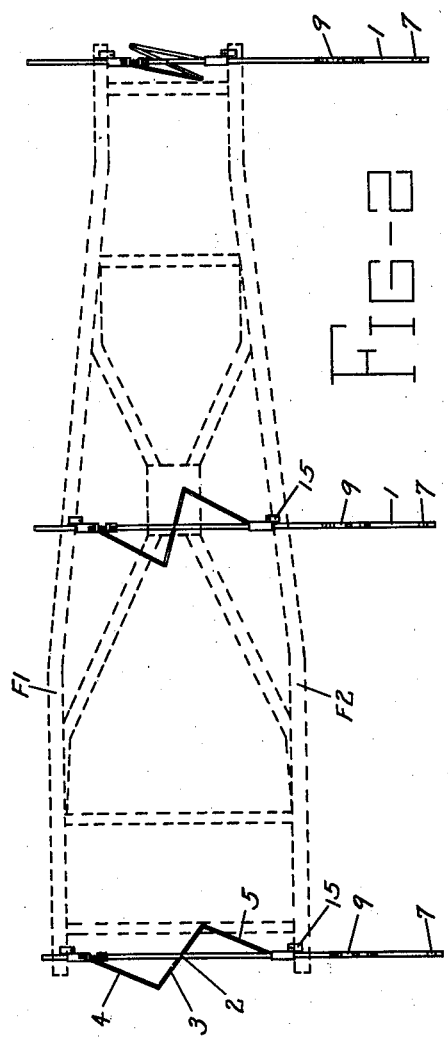
INVENTOR.
Roy D. Smith
BY
Merrill M. Blackburn.

Patented June 11, 1946

2,401,980

UNITED STATES PATENT OFFICE 2,401,980

MEANS FOR GAUGING VEHICLE FRAMES

Roy D. Smith, Mertzon, Tex., assignor to Bee-Line Company, Scott County, Iowa, a copartnership Application October 11, 1943, Serial No. 505,877

2 Claims. (Cl. 33—46)

The present invention relates to an apparatus for use in determining the correctness or incorrectness of the form of the frame of a motor vehicle and the method of determining such correctness or incorrectness. This apparatus is similar to that shown in my Patent No. 2,070,518, issued February 9, 1937, and also bears a certain resemblance to my Patent No. 2,000,866, issued May 7, 1935. However, in both of these, the gauge line is located below and centrally of the vehicle in a very difficult position for observation. The present apparatus removes the observation line from beneath the vehicle to a point at one side thereof, as clearly indicated in the drawing.

The main purpose of this invention is to render the checking of the form of a motor vehicle frame much easier than with any prior apparatus and, incidentally, to make it possible to demonstrate very readily to the owner of the motor vehicle if the vehicle frame is out of true form. A further object of this invention is to provide a simplified apparatus for the purpose indicated which will be less expensive to manufacture and at least as efficient as prior devices, if not more so. A further object of this invention is the provision of an improved method of checking the correctness or incorrectness of the form of a motor vehicle frame, the same being such as may be carried out with various apparatuses of the type suggested in the drawing.

In the drawing annexed hereto and forming a part hereof,

Fig. 1 represents an elevation of a structure embodying my present invention, the same being shown as applied to a motor vehicle frame, the side members of which are shown in cross-section; and Fig. 2 represents three units of my new construction applied to a motor vehicle frame, the latter being shown in dotted lines.

In use, a plurality, not less than three in number, of units similar to that shown in Fig. 1 are needed in order to determine whether or not the vehicle center line is straight or is bent laterally to the right or left. Also, this apparatus can be used for determining horizontal straightness or crookedness, as will be readily apparent to the mechanic using it.

The frame side members are denoted in the drawing by the characters F1 and F2. A single unit of the apparatus comprises a bar 1, a pivot member 2, a lever 3 pivoted thereon, and links 4 and 5 pivotally connected at one end to the respective ends of the lever 3 and at their second ends to slides 6 which are slidably mounted upon the bar 1. This unit also comprises a sighting device 7 mounted at one extremity of the bar 1, an exact measured distance from the pivot member 2. This sighting device 7 has a pair of cross wires 8 intersecting perpendicularly at the center of the ring forming a part of the sighting device 7. One of the cross wires is extended above the ring, as indicated at 8a. On this bar 1 is mounted a level 9 by means of which it is possible to determine if the bar 1 is horizontal or inclined.

An abutment 10 is adjustably mounted on the bar 1 and is contacted by one end of the coil spring 11, the other end of which contacts the upstanding abutment of one of the slides 6. Each of the slides is provided with a vertical sleeve 12 at one side of the opening in the slide through which the bar 1 extends. The sleeve 12 is provided with a set screw 13 by means of which the support 14 may be held in adjusted position with reference to the sleeve 12 and therefore with reference to the bar 1. At the upper end of each upright 14 is a projection 15, and it is by means of these projections that the apparatus is suspended from the side frame members F1 and F2.

Since the units are identical in construction, the links 4 and 5 are the same length and the distances from the pivot 2 to the pivots 16 the same, it follows that any change in the position of one of the slides 6 with relation to the bar 1 is accompanied by a similar change in position of the other slide 6. Therefore, the pivot 2 will always be located in a plane equally distant from the side frame members, unless the frame has been distorted. On the other hand, if the frame has been distorted laterally, then this erstwhile plane is bent out of shape and the pivot members 2 are no longer in alignment. This results in the sighting devices being out of alignment. By shifting the position of one of the testing units, preferably the middle one, lengthwise along the frame, it will be possible to determine the point of distortion of the frame for, at this point, the center line through the sighting devices 7 will be bent the greatest amount. Having located the point of bend and the amount thereof, it is necessary only to apply the appropriate frame straightening equipment to the motor vehicle frame and bend the same until the center line of the sighting device indicates that the frame has been restored to its normal condition.

It is obvious from the drawing that in the wider part of the frame it is necessary to have the abutment 10 nearer to the end of the bar 1 and, at the narrow end of the frame, this abutment must be farther from the end of the bar. However, as indicated above, the distance between the pivot member 2 and the intersection of the cross wires 8 remains constant.

It will of course be understood that the specific description of structure set forth above may be departed from without departing from the spirit of this invention as set forth herein and in the appended claims.

Having now described my invention, I claim:

1. A structure for the purpose indicated comprising an elongated bar, a pivot member connected to said bar and extending substantially perpendicularly therefrom, said pivot member being connected to the bar between its middle and one end thereof, an abutment adjustably secured to said bar between the pivot member and the adjacent end of the bar, a post-supporting slide mounted on and freely slidable along the bar between said abutment and the end of the bar, a spring located between and abutting the abutment and the slide to exert pressure against the slide and cause the same to slide along the bar, a post supported by said slide and extending upwardly therefrom, a second slide on said bar approximately midway of the length thereof, a post carried by the second slide and extending upwardly similarly to the first post, a lever pivotally mounted midway of its length upon said pivot member, links pivotally connected at one end to the respective end portions of said lever and at their opposite ends to the said slides, whereby to cause equal and opposite sliding of said slides upon said bar when one of them is moved thereon, and a sighting device securely mounted upon the second end of said bar in a position to be outside of the body lines of a motor vehicle when used therewith.

2. A sighting device to be used as a part of a gauge in checking the form of a motor vehicle frame, comprising an elongated bar having adjacent one end a sighting means and toward the other end a pivot member, a pair of abutments to engage the side frame members of a motor vehicle, said abutments being located on and for sliding movement along said bar upon opposite sides of said pivot member, means connecting said abutments to said pivot member to insure equal and opposite motion of the abutments when one is moved, and a level secured to said bar for use in determining whether or not said bar is horizontal when in use.

ROY D. SMITH.